(No Model.)
E. J. PENNINGTON.
SPLIT PULLEY.
No. 428,520. Patented May 20, 1890.
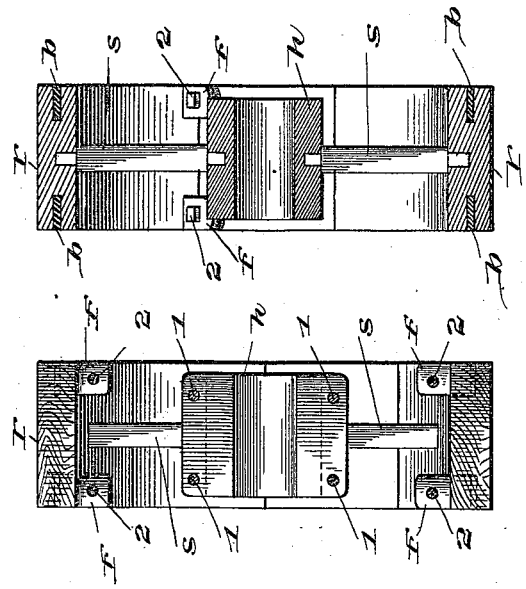
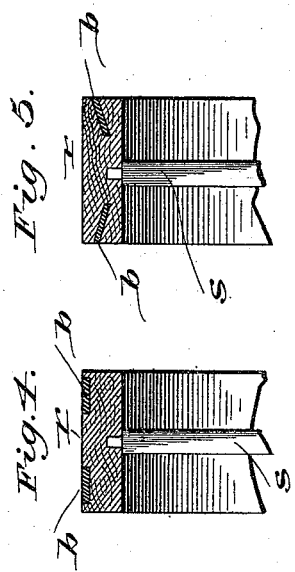
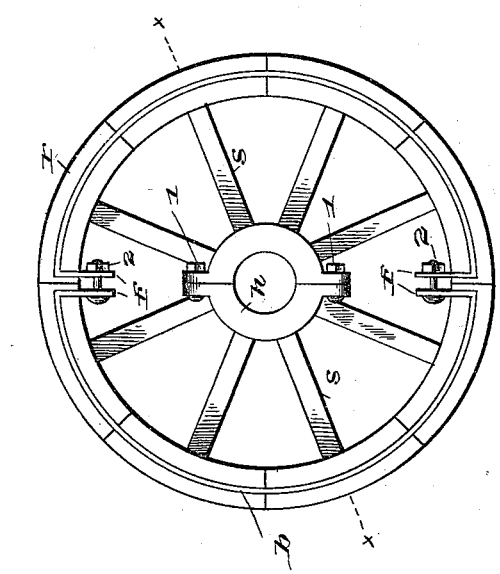
WITNESSES:
INVENTOR
Edward J. Pennington
BY
C. P. Jacobs,
ATTORNEY

UNITED STATES PATENT OFFICE.

EDWARD J. PENNINGTON, OF MOUNT CARMEL, ILLINOIS.

SPLIT PULLEY.

SPECIFICATION forming part of Letters Patent No. 428,520, dated May 20, 1890.

Application filed March 19, 1890. Serial No. 344,522. (No model.)

*To all whom it may concern:*

Be it known that I, EDWARD J. PENNINGTON, of Mount Carmel, county of Wabash, and State of Illinois, have invented certain new and useful Improvements in Split Pulleys; and I do hereby declare that the following is a full, clear, and exact description thereof, reference being had to the accompanying drawings, in which like letters refer to like parts.

My invention relates to the construction of split pulleys and will be understood from the following description.

In the drawings, Figure 1 is a side view of my device. Fig. 2 is an inner face view of one of the halves thereof. Fig. 3 is a section on the line $x\,x$, Fig. 1. Figs. 4 and 5 are detail views showing different modifications of the manner of letting the band into the rim.

In detail the pulley is composed of two equal parts or halves, each being precisely like the other, the whole united by bolts 1 on either side of the hub and bolts 2 at the rim, as shown in Fig. 1. The rim itself consists of a series of segments $r$, the grain of each segment running across the rim, spokes $s$ being tenoned into the iron hub $h$. The segments of each half of the rim are further united by means of metal bands $b$, let into a straight kerf formed in the rim, as shown in Fig. 3, or flared and let into a similar kerf in the manner shown in Fig. 5, or let into the face of the rim, as shown in Fig. 4. The ends of these bands are turned down, forming flanges $f$, through which openings are formed to admit bolts 2 for uniting the pulley-sections. The flanges $f$, instead of being formed integral with the band, may be made separately and fastened independently to the abutting ends of the rim. The hub $h$ is constructed of iron in two halves united by bolts 1, and by loosening the bolts 1 and 2 the halves of the pulley may be separated and removed from the shaft with little trouble. The pulley thus constructed, the segments connected to the hub, the spokes tenoned into each and further united by metal bands $b$, the whole drawn together by the bolts 1 and 2, make a strong and serviceable pulley that can be built with comparatively little expense.

What I claim as my invention, and desire to secure by Letters Patent, is the following:

1. A split pulley composed of two equal halves or sections, each composed of a half of the metal hub $h$, and spokes $s$, tenoned therein and into the rim, the rim formed of segments $r$, such segments further united by metal bands $b$ let into such rim and provided with flanges $f$, with openings to receive bolts for securing the parts together, substantially as shown and described.

2. A split pulley composed of two equal sections, each section comprising a segmental rim $r$, and spokes $s$, tenoned into the segments of the rim and into the hub $h$, the rim-segments further secured in position by metal bands $b$ let into the rim and provided with turned-down flanges $f$ at their abutting ends, the whole united by bolts 1 at the hub and 2 at the meeting ends of the rim, substantially as shown and described.

3. A split pulley composed of two equal parts, whose rim is formed of segments $r$, the grain running at right angles to the halves of the rim, such segments secured to a central metal hub by spokes $s$, tenoned into such hub and rim-segments, the latter further secured by metal bands let into the rim, all united by bolts 1 at the hub and 2 at the meeting ends of the rim, substantially as shown and described.

In witness whereof I have hereunto set my hand this 6th day of January, 1890.

EDWARD J. PENNINGTON.

Witnesses:
H. D. NEALY,
E. B. GRIFFITH.